(12) United States Patent
Mizumura

(10) Patent No.: US 11,953,447 B2
(45) Date of Patent: Apr. 9, 2024

(54) DEFECTIVE PART RECOGNITION DEVICE AND DEFECTIVE PART RECOGNITION METHOD

(71) Applicant: V TECHNOLOGY CO., LTD., Kanagawa (JP)

(72) Inventor: Michinobu Mizumura, Kanagawa (JP)

(73) Assignee: V TECHNOLOGY CO., LTD., Kanagawa (JP)

(*) Notice: Subject to any disclaimer, the term of this patent is extended or adjusted under 35 U.S.C. 154(b) by 276 days.

(21) Appl. No.: 17/636,182

(22) PCT Filed: Jun. 22, 2020

(86) PCT No.: PCT/JP2020/024371
§ 371 (c)(1),
(2) Date: Feb. 17, 2022

(87) PCT Pub. No.: WO2021/033417
PCT Pub. Date: Feb. 25, 2021

(65) Prior Publication Data
US 2022/0291136 A1 Sep. 15, 2022

(30) Foreign Application Priority Data
Aug. 21, 2019 (JP) .................... 2019-151063

(51) Int. Cl.
*G01N 21/88* (2006.01)
*G06T 7/00* (2017.01)

(52) U.S. Cl.
CPC ..... *G01N 21/8806* (2013.01); *G01N 21/8851* (2013.01); *G06T 7/0004* (2013.01);
(Continued)

(58) Field of Classification Search
CPC ........ G01N 21/8806; G01N 21/8851; G01N 2021/8861; G01N 2021/8887;
(Continued)

(56) References Cited

U.S. PATENT DOCUMENTS

| 5,991,699 A | 11/1999 | Kulkarni et al. |
| 2014/0355873 A1* | 12/2014 | Sah .......... G06T 7/49 |
| | | 382/165 |

FOREIGN PATENT DOCUMENTS

| CN | 105699385 A | 6/2016 |
| JP | 2008-188638 A | 8/2008 |
| JP | 2011-165479 A | 8/2011 |

OTHER PUBLICATIONS

International Search Report issued in corresponding International Application No. PCT/JP2020/024371 dated Sep. 24, 2020 (5 pages).
(Continued)

Primary Examiner — Jamil Ahmed
(74) Attorney, Agent, or Firm — Osha Bergman Watanabe & Burton LLP

(57) ABSTRACT

A defective part recognition device includes a microscope for obtaining a magnified image of a unit area for recognizing a defective part on the surface of a multi-layer film substrate; a spectral camera having an imaging surface where the magnified image is formed; and an information processing part for processing the spectrum information from the spectral camera. The information processing part includes a machine learning part for a clustering process on the spectrum information for each pixel, and a defect recognition part for recognizing a defective part from the result of the machine learning part. The machine learning part sets a cluster in the unit area and generates a histogram with a frequency, the number of pixels clustered into the cluster. The defect recognition part compares the frequency distri-
(Continued)

bution of the generated histogram with that of a histogram free of defects and recognizes a defective part.

7 Claims, 8 Drawing Sheets

(52) U.S. Cl.
CPC .............. *G01N 2021/8861* (2013.01); *G01N 2021/8887* (2013.01); *G06T 2207/20081* (2013.01); *G06T 2207/20084* (2013.01)

(58) Field of Classification Search
CPC ......... G06T 7/0004; G06T 2207/20081; G06T 2207/20084
See application file for complete search history.

(56) References Cited

OTHER PUBLICATIONS

Written Opinion issued in corresponding International Application No. PCT/JP2020/024371 dated Sep. 24, 2020 (6 pages).

* cited by examiner

COMPARISON BETWEEN PIXEL COORDINATE POSITION DISTRIBUTIONS OF
CLUSTER (LAYER STRUCTURE) WITH RECOGNIZED DEFECTIVE PART

DEFECTIVE PART RECOGNITION DEVICE AND DEFECTIVE PART RECOGNITION METHOD

TECHNICAL FIELD

The present invention relates to a defective part recognition device and method for a multi-layer film substrate.

BACKGROUND ART

In the manufacturing step of an FPD (Flat Panel Display), if a defective pixel is detected in the step of inspection, a multi-layer film substrate such as a TFT (Thin Film Transistor) is repaired by irradiating the defective part of a defective pixel with a laser beam.

At this point, the defective part is visually recognized through a microscope image or is recognized by comparing the image of the defective part and a reference image free of defective parts and identifying the position and characteristics of the defective part according to an image processing technique (see PTL 1).

CITATION LIST

Patent Literature

[PTL 1] Japanese Patent Application Publication No. 2008-188638

SUMMARY OF INVENTION

Technical Problem

As for a defective part of a multi-layer film substrate, it is necessary to recognize which layer of the multi-layer film includes the defective part and identify the layer structure of the underlayer of the layer including the defective part. According to the difference, a machining recipe for laser repair is properly selected. Conventionally, in visual recognition of a defective part through a microscope image, the identification of the layer structure of a defective part inevitably depends on the experience and knowledge of an operator. Thus, the skill of an operator may affect the quality of correction, for example, recipes for repair may vary according to a difference in recognition.

Furthermore, according to the related art for recognizing a defective part by using an image processing technique, information obtained from a defective part through a two-dimensional image is limited to the color, contrast, and shape of the defective part. Thus, the layer structure of the underlayer of a defect is not possible to be precisely identified. For this reason, the related art depends on the experience and knowledge of an operator in the end and thus is not possible to make a repair of high quality.

The present invention is proposed to address the problem. Specifically, an object of the present invention is to mechanically recognize a state of a defective part in a multi-layer film substrate and make a repair regardless of the skill of an operator.

Solution to Problem

In order to solve the problem, the present invention is configured as follows:

A defective part recognition device characterized by including a microscope for obtaining a magnified image of a unit area for recognizing a defective part on the surface of a multi-layer film substrate by irradiating the surface with white incident light; a spectral camera having an imaging surface on which the magnified image is formed, the spectral camera outputting spectrum information on the magnified image for each pixel of the imaging surface; and an information processing part for processing the spectrum information outputted from the spectral camera, wherein the information processing part includes a machine learning part for performing a clustering process on the spectrum information for each pixel, and a defect recognition part for recognizing the defective part from a process result of the machine learning part, the machine learning part sets a cluster according to a layer structure in the unit area and generates a histogram with a frequency that is a number of pixels clustered into the cluster, and the defect recognition part compares a frequency distribution of the generated histogram with a frequency distribution of a histogram free of defects and recognizes a defective part depending on presence of a cluster having a difference in frequency.

BRIEF DESCRIPTION OF DRAWINGS

FIG. 5 at (a) indicates the coordinate positions of a normal pattern in a layer structure, FIG. 5 at (b) indicates the coordinate positions of pixels clustered in a layer structure including a defective part, and FIG. 5 at (c) indicates the coordinate positions of the pixels of a defective area.

DESCRIPTION OF EMBODIMENT

Figure 1:
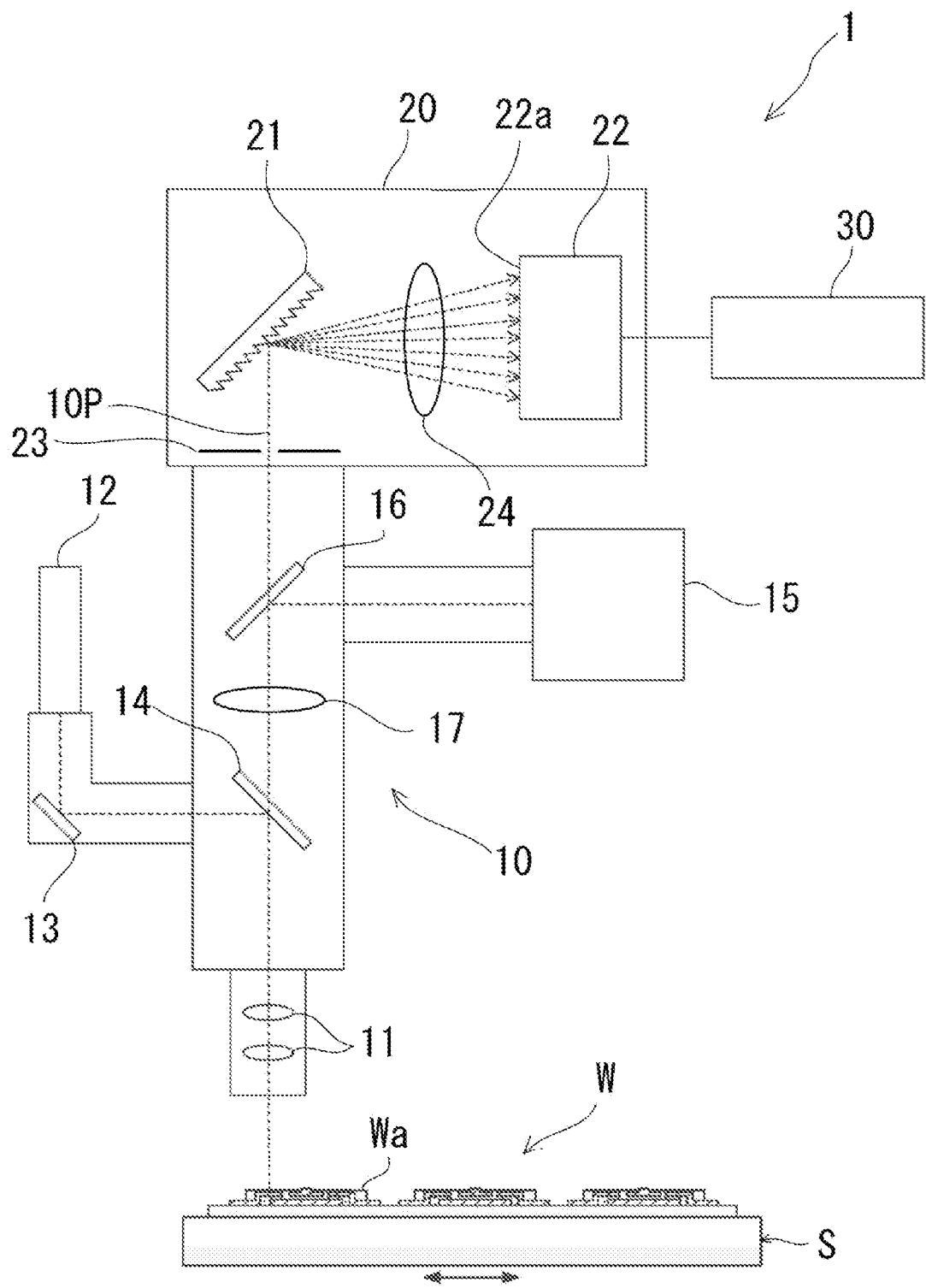
FIG. 1 is an explanatory drawing illustrating a defective part recognition device.

An embodiment of the present invention will be described below with reference to the accompanying drawings. Hereinafter, duplicate reference numerals in different drawings denote parts having the same functions, and a redundant explanation thereof in the drawings is optionally omitted.

As illustrated in FIG. 1, a defective part recognition device 1 recognizes a defective part on a multi-layer film substrate W that is a work set on a stage S. The defective part recognition device 1 includes a microscope 10, a spectral camera 20, and an information processing part 30.

The microscope 10 is an optical microscope that irradiates a surface Wa of the multi-layer film substrate W with white incident light and obtains a magnified image of a unit area (e.g., a pixel area of a TFT substrate) for recognizing a defective part on the surface Wa. The microscope 10 is provided with an optical system including objective lenses 11 and a tube lens 17, a white light source 12 for irradiating the surface Wa with white incident light, and an optical system (a mirror 13 and a half mirror 14) thereof. Moreover, the microscope 10 optionally includes a monitor camera 15 for obtaining a monitor image for a magnified image of the surface Wa and an optical system (half mirror 16) for the monitor camera 15.

The spectral camera 20 including a slit 23 and a grating element (diffraction grating) 21 on an optical axis 10P of the optical system of the microscope 10 separates wavelengths of light reflected from the surface Wa, images the separated light on an imaging surface 22a of a two-dimensional camera 22 via a relay lens system 24, and acquires spectrum information on a magnified image of the surface Wa for each pixel of the imaging surface 22a according to line spectroscopy.

Figure 2:
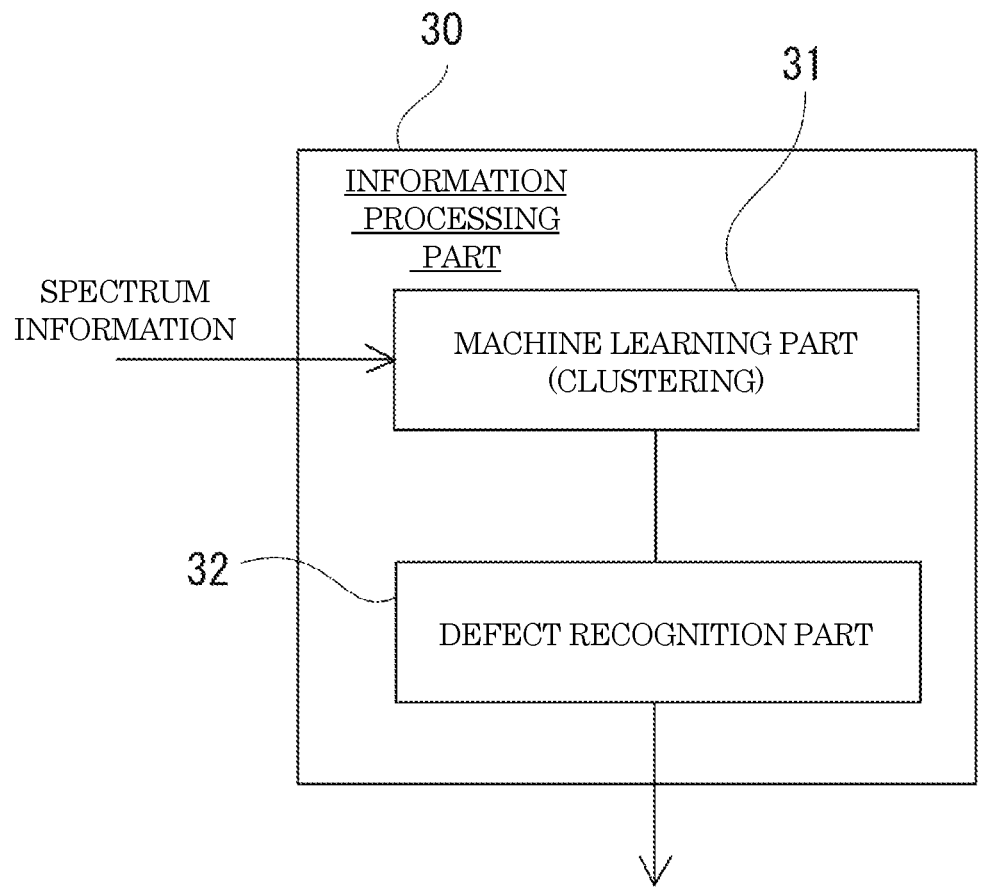
FIG. 2 is an explanatory drawing illustrating an information processing part for the defective part recognition device.

The information processing part 30 processes the spectrum information outputted from the spectral camera 20. As illustrated in FIG. 2, the information processing part 30 includes a machine learning part 31 for performing a clustering process on the spectrum information for each pixel, and a defect recognition part 32 for recognizing a defective part from the process result of the machine learning part 31. The recognition result of the defect recognition part 32 is outputted to the control part of a laser repair device, which is not illustrated, and is used for determining whether to perform laser beam machining on a defective part and selecting a machining recipe in laser beam machining.

Figure 3:
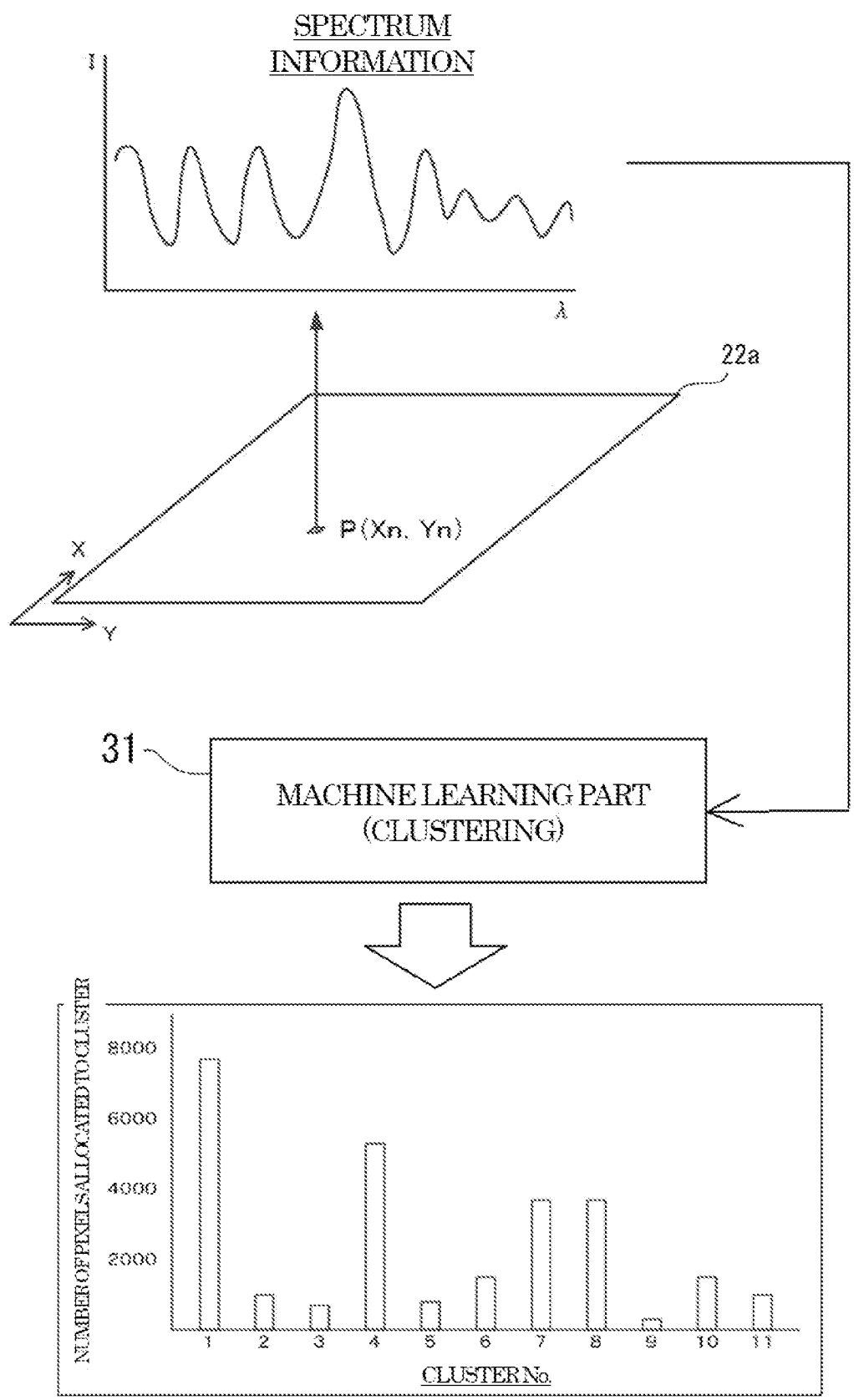
FIG. 3 is an explanatory drawing illustrating the clustering process of a machine learning part.

As illustrated in FIG. 3, the spectral information outputted from the spectral camera 20 is a spectrum distribution outputted for each pixel P(Xn,Yn) of the imaging surface 22a of the two-dimensional camera 22. The pixel P(Xn,Yn) has position information on X-Y plane coordinates. The position of the pixel P(Xn,Yn) corresponds to a specific position in a magnified image to be reviewed.

Unlike simple two-dimensional image information on the surface Wa, the spectrum information outputted for each pixel from the spectral camera 20 includes information that enables the estimation of a layer structure at a position on the surface Wa, the position corresponding to the pixel P(Xn, Yn) of the imaging surface 22a. This is because light reflected from the surface Wa of the multi-layer film substrate W indicates a spectrum distribution specific to the layer structure, for example, the reflected light demonstrates various spectral characteristics according to a difference between the surface layers of a multi-layer film and interferes with light reflected from the interfaces of the layers of the multi-layer film.

When clustering the spectrum information outputted for each pixel from the spectral camera 20, the machine learning part 31 sets, as the number of clusters, the number of layer structures in the unit area of the multi-layer film substrate W to be reviewed. In this configuration, the layer structure is possible to be recognized in advance from design information on the multi-layer film substrate W. In an example illustrated in FIG. 3, the unit area of the multi-layer film substrate W has eleven layer structures, and eleven clusters No. 1 to 11 are set accordingly.

The machine learning part 31 does not identify the structure of the layer structure corresponding to the cluster. Pixels including spectrum information on similar spectrum distributions are collected into a cluster, and the pixels in the imaging surface 22a are allocated into eleven clusters in the example of FIG. 3. Thus, as illustrated in FIG. 3, the machine learning part 31 generates a histogram in which the frequency is the number of pixels clustered into each cluster.

If the unit area to be reviewed does not have a defective part, the histogram is generated as designed, whereas if the unit area has a defective part, the frequency of the histogram deviates from a design value. The defect recognition part 32 compares the frequency distribution of the histogram generated by the machine learning part 31 with the frequency distribution of a histogram having a design value without any defects, and recognizes, as a layer structure that may have a defective part, the layer structure of the cluster having a difference in frequency.

Figure 4:
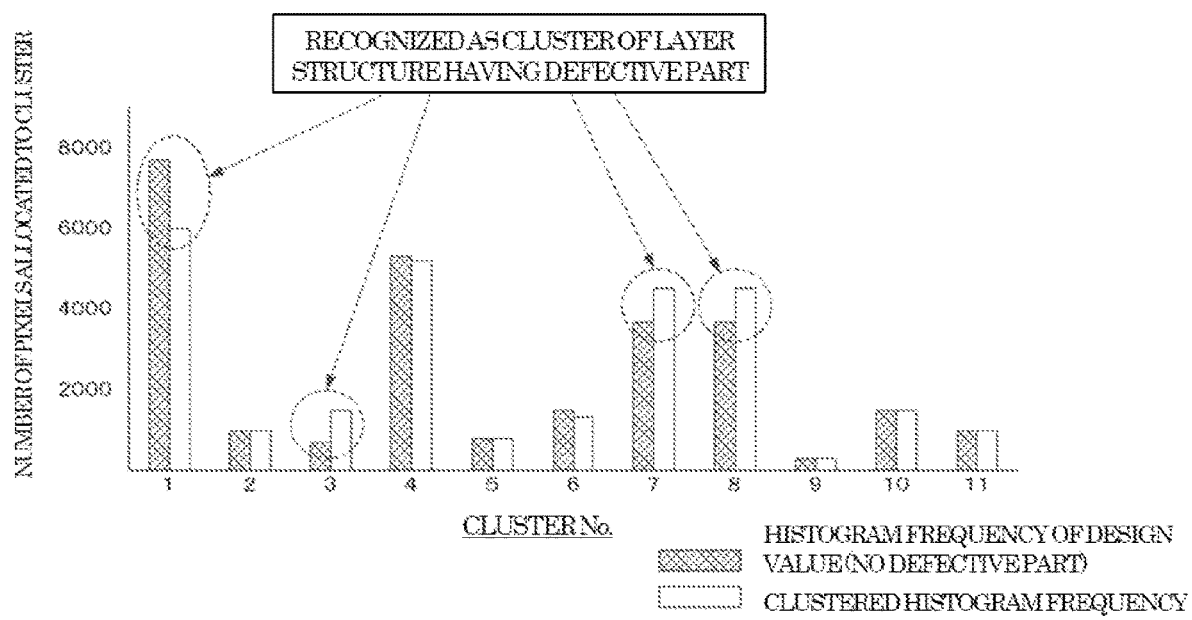
FIG. 4 is an explanatory drawing illustrating the function of a defect recognition part.

FIG. 4 schematically indicate the process of the defect recognition part 32. In this case, the defect recognition part 32 recognizes the relationship between each cluster and the layer structure that are set in the machine learning part 31. As indicated by broken line circles in FIG. 4, the cluster having a large difference between the histogram frequency of the design value and the frequency of the clustered histogram is specified, and the layer structure corresponding to the cluster is recognized as a layer structure that may have a defective part.

Figure 5:
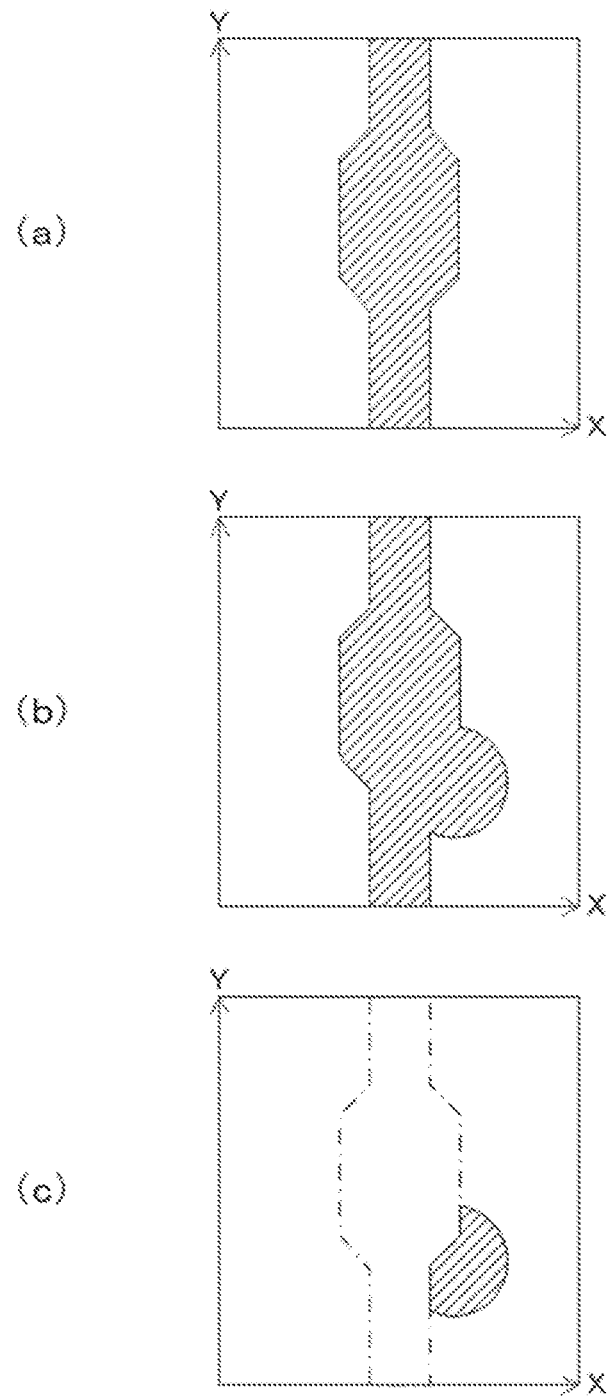
FIG. 5 is an explanatory drawing of the defect position recognition function of the defect recognition part.

As illustrated in FIG. 5 at (a) to (c), the defect recognition part 32 then recognizes the position of a defective part according to a difference between the coordinate position of a pixel clustered in the cluster having a difference in frequency and the coordinate position of a normal pattern in the layer structure in the generated histogram. Specifically, if the presence of a defective part in the layer structure corresponding to the cluster 7 in FIG. 4 is recognized, the coordinate position of the normal pattern in the layer structure is assumed to be a coordinate position distribution in FIG. 5 at (a). If the coordinate position distribution of pixels actually clustered into the cluster 7 is indicated on X-Y coordinates, a coordinate position distribution in FIG. 5 at (b) is obtained. In this case, the defect recognition part 32 determines a difference between the distribution of FIG. 5 at (b) and the distribution of FIG. 5 at (a), thereby recognizing the position of the defective part (the coordinate position distribution of pixels in a defective area) as illustrated in FIG. 5 at (c).

Figure 6:
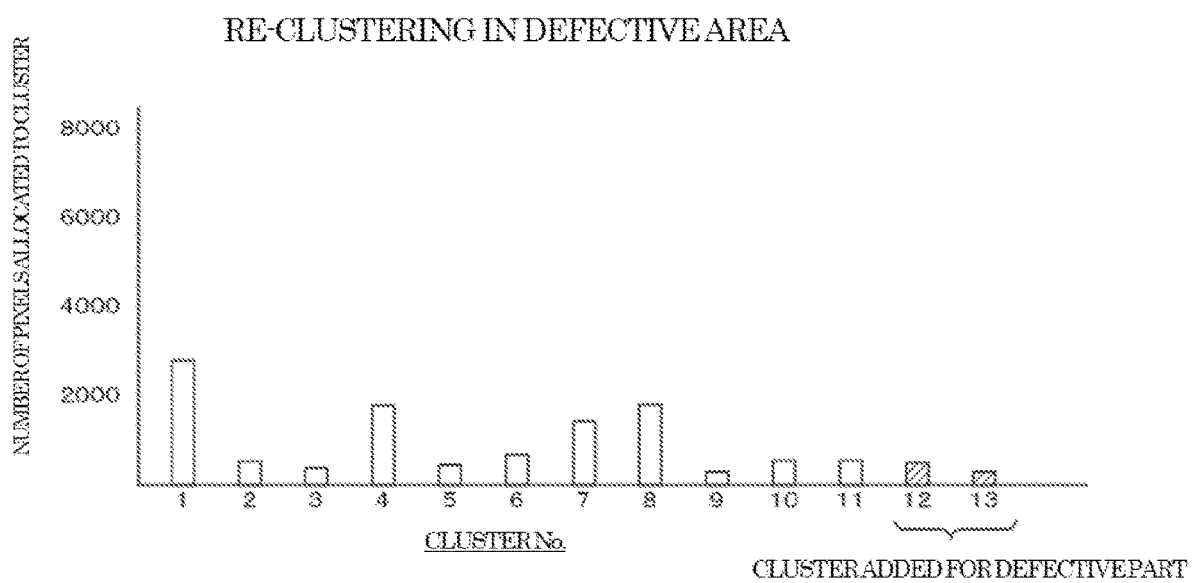
FIG. 6 is an explanatory drawing illustrating a re-clustering clustering process in the defective area.

In response to the recognition, as illustrated in FIG. 6, the machine learning part 31 performs re-clustering on spectrum information on pixels located in the defective area, based on the recognition result of the defect position from the defect recognition part 32. At this point, the machine learning part 31 sets clusters (No. 12, 13) for defective parts in addition to the clusters (No. 1 to 11) corresponding to the set layer structures.

In the re-clustering, if the layer structure of a pixel position in the defective area is a known layer structure, pixels are clustered into the set clusters (No. 1 to 11) but in the case of other foreign matters, pixels are clustered into the additional clusters (No. 12, 13) for defective parts. Since the pixels clustered into the clusters (No. 12, 13) for defective parts are possible to be regarded as a different structure from a design layer structure, the pixels are possible to be assumed to be, for example, a layer structure generated by the adhesion of foreign matters. If pixels are clustered into the clusters (No. 12, 13) for defective parts, the defect recognition part 32 recognizes the type of a defective part based on the assumption and according to spectrum information on the clustered pixels.

Figure 7:
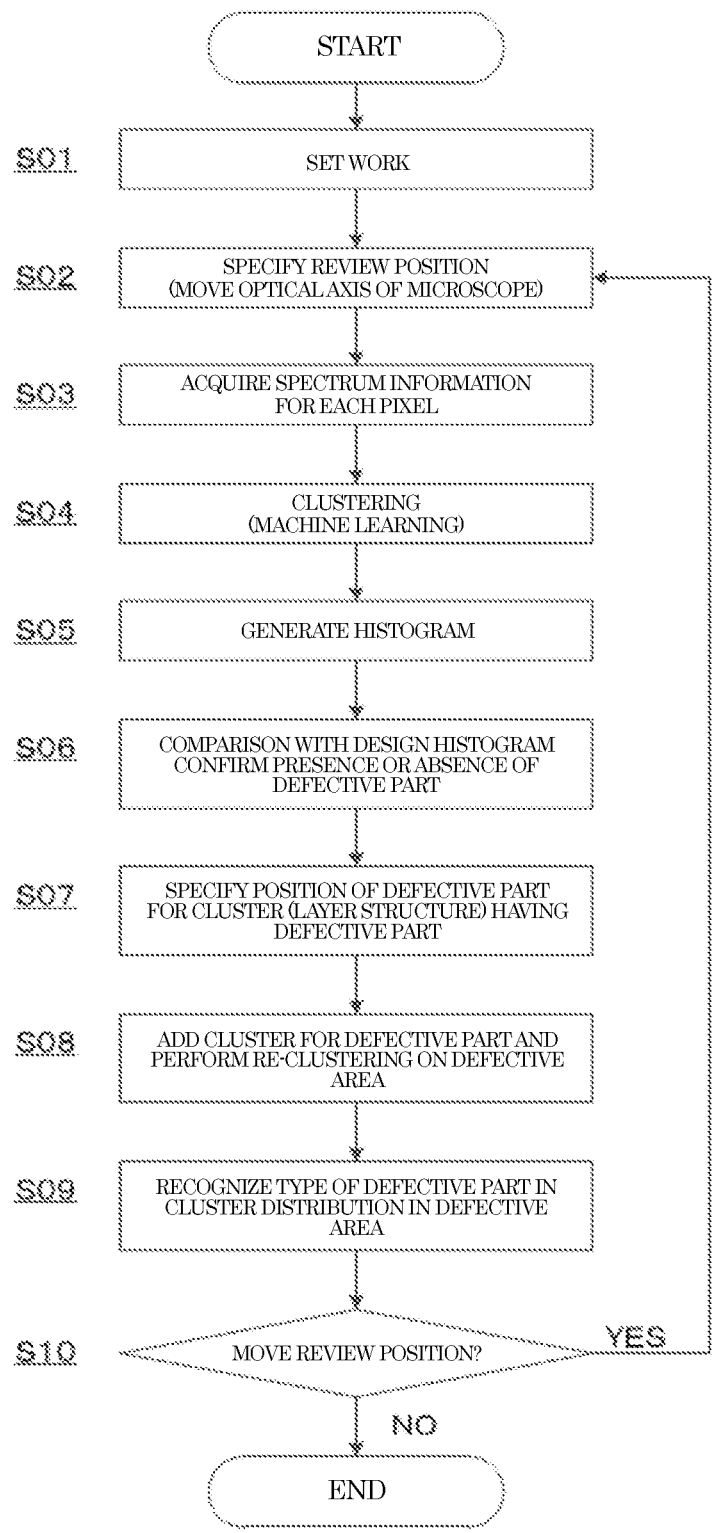
FIG. 7 is an explanatory drawing indicating the flow of a defect recognition method.

FIG. 7 indicates an example of the steps of the defective part recognition method using the defective part recognition device 1. At the start of the recognition of a defective part, first, the multi-layer film substrate W serving as a work is set on the stage S (step S01), the review position of the surface Wa is specified, and then the optical axis of the microscope 10 is moved to the review position (step S02).

Subsequently, the surface Wa at the review position is irradiated with white incident light, a magnified image of a unit area to be reviewed is obtained by the microscope 10, and spectrum information is acquired for each pixel of the imaging surface 22a by using the spectral camera 20 having the imaging surface 22a on which the magnified image is formed (step S03).

The spectrum information acquired for each pixel is inputted to the machine learning part 31 in the information processing part 30 and is subjected to the clustering process (step S04). At the completion of the clustering process, as described above, the number of layer structures in the unit area to be reviewed is set as the number of clusters, and a histogram is generated with a frequency that is the number of pixels clustered into each cluster (step S05).

When the histogram is generated by the machine learning part 31, the defect recognition part 32 compares the frequency distribution of the histogram generated by clustering with the frequency distribution of the histogram of the design value, and confirms the presence or absence of a defective part depending on the presence of the cluster having a difference in frequency (step S06).

As illustrated in FIG. 5, the defect recognition part 32 then specifies the position of a defective part (defective area) by comparing the coordinate position distribution of pixels clustered in the cluster having a defective part with the coordinate position distribution of the normal pattern of the layer structure (step S07). Subsequently, as described above, the machine learning part 31 adds the clusters for the defective part and performs re-clustering on pixels located in the specified defective area (step S08).

After the re-clustering, the defect recognition part 32 recognizes the type of the defective part based on the distribution state of the pixels clustered in the clusters for the defective part and spectrum information on the pixels clustered therein (step S09).

Thereafter, it is determined whether to move the review position (step S10). If the review position is moved (step S10: YES), the process from step S02 is performed on the moved review position. If the review position is not moved (step S10: NO), the process is terminated.

Figure 8:
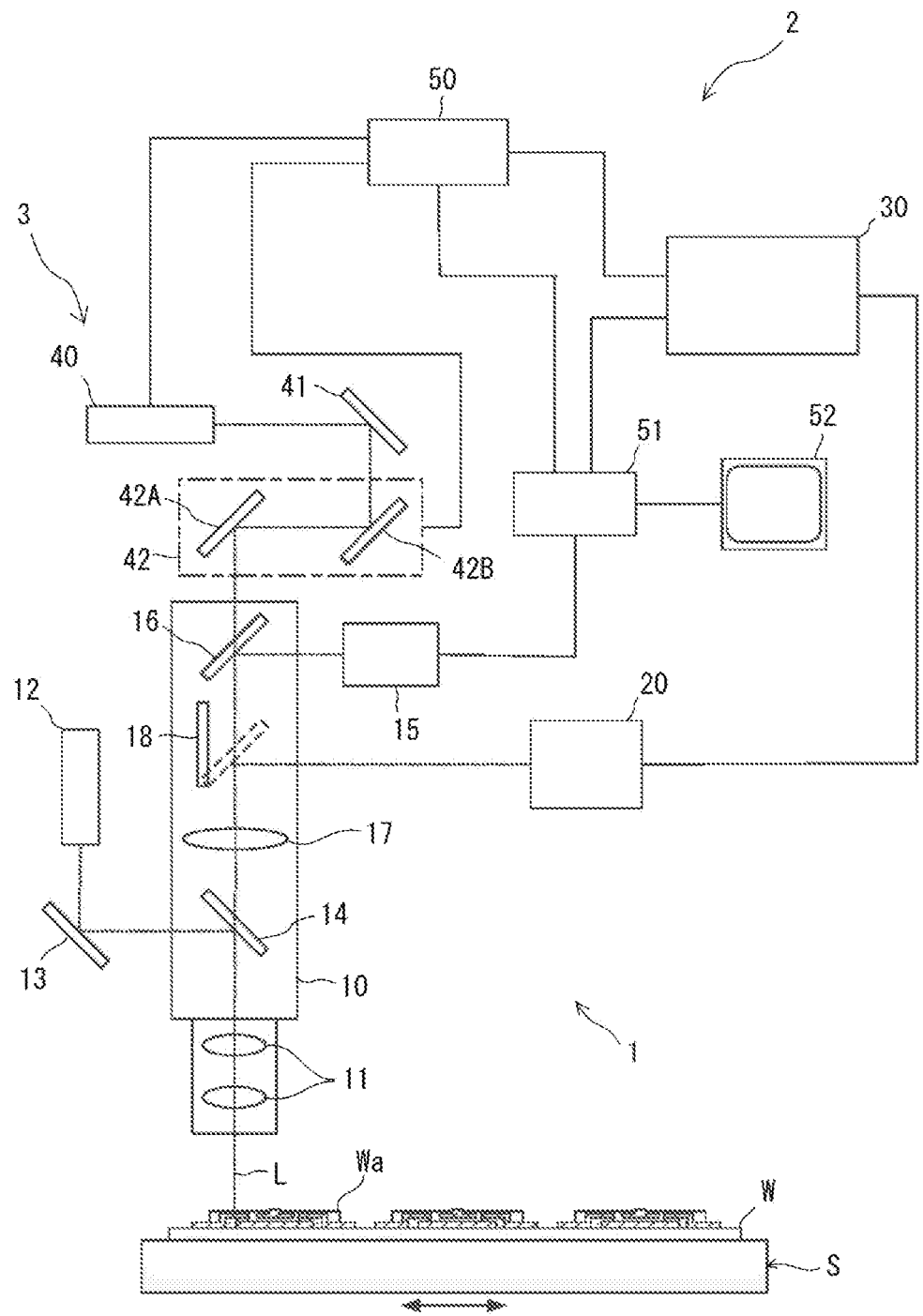
FIG. 8 is an explanatory drawing illustrating a laser repair device provided with the defective part recognition device.

FIG. 8 illustrates a configuration example of the laser repair device 2 provided with the defective part recognition device 1. The laser repair device 2 repairs, by irradiation of a laser beam L, the defective part recognized by the defect recognition part 32 in the information processing part 30. The laser repair device 2 includes a laser radiation part 3 for the irradiation of the laser beam L coaxially with the optical axis of the microscope 10.

The laser radiation part 3 includes, for example, a laser beam source 40 and a laser scanner 42. The laser beam L emitted from the laser beam source 40 enters the optical system of the microscope 10 via a mirror 41 and galvanometer mirrors 42A and 42B of the laser scanner 42, and is emitted to the surface Wa of the unit area in which a magnified image is obtained by the microscope 10.

In the illustrated example, a switching mirror 18 that is moved to and is removed from the optical axis of the microscope 10 is provided. The entry of the switching mirror 18 to the optical axis of the microscope 10 causes reflected light from the surface Wa to be incident into the spectral camera 20. The defective part recognition device 1 is operated to remove the switching mirror 18 from the optical axis of the microscope 10, enabling the operation of the laser repair device 2 for irradiating the surface Wa with the laser beam L.

The laser repair device 2 provided with the defective part recognition device 1 first operates the defective part recognition device 1, so that the defect recognition part 32 transmits, to a laser control part 50, information including the presence or absence of a defective part. The information further includes, in the presence of a defective part, the position of the defective part, the layer structure of the defective part, and the type of the defective part. The laser control part 50 determines whether to perform laser repair based on the information transmitted from the defect recognition part 32. If the laser repair is performed, a laser irradiation range is set based on position information on the defective part, and a machining recipe is set based on the layer structure of the defective part or type information on the defective part.

Moreover, in the illustrated example, a magnified image of the microscope 10 is also formed in the monitor camera 15. Laser repair is possible to be performed while observing the image captured by the monitor camera 15 through a display device 52. At this point, a two-dimensional image acquired by the monitor camera 15 undergoes image processing in an image processing part 51 and is transmitted to the laser control part 50 and the information processing part 30. The laser radiation part 3 is possible to be also controlled by the two-dimensional image.

According to the embodiment of the present invention, a defective part of the multi-layer film substrate W is possible to be mechanically recognized in greater detail. The laser repair is possible to be set based on the recognized information. This achieves high-quality repair regardless of the skill of an operator and automation from the recognition to machining of a defective part, so that the repair is possible to be efficiently performed with high quality.

The embodiments of the present invention were specifically described with reference to the accompanying drawings. The specific configuration is not limited to the foregoing embodiment. The present invention includes design changes without departing from the scope of the present invention. The techniques of the foregoing embodiments are possible to be used in combination unless contradictions or problems occur in the objects and configurations.

REFERENCE SIGNS LIST

1 Defective part recognition device
2 Laser repair device
3 Laser radiation part
10 Microscope
10P Optical axis
11 Objective lens
12 White light source
13 Mirror
14, 16 Half mirror
15 Monitor camera
17 Tube lens
18 Switching mirror
20 Spectral camera
21 Grating element
22 Two-dimensional camera
22a Imaging surface
23 Slit
30 Information processing part
31 Machine learning part
32 Defect recognition part
40 Laser beam source
41 Mirror
42 Laser scanner
42A, 42B Galvanometer mirror
50 Laser control part
51 Image processing part
52 Display device
S Stage W Multi-layer film substrate
Wa Surface
L Laser beam

What is claimed is:

1. A defective part recognition device comprising:
a microscope for obtaining a magnified image of a unit area for recognizing a defective part on a surface of a multi-layer film substrate by irradiating the surface with white incident light;
a spectral camera having an imaging surface on which the magnified image is formed, the spectral camera outputting spectrum information on the magnified image for each pixel of the imaging surface; and
an information processing part for processing the spectrum information outputted from the spectral camera,
wherein the information processing part includes a machine learning part for performing a clustering process on the spectrum information for each pixel, and a defect recognition part for recognizing the defective part from a process result of the machine learning part,
the machine learning part sets a cluster according to a layer structure in the unit area and generates a histogram with a frequency that is a number of pixels clustered into the cluster, and
the defect recognition part compares a frequency distribution of the generated histogram with a frequency distribution of a histogram free of defects, and recognizes a defective part depending on presence of a cluster having a difference in frequency.

2. The defective part recognition device according to claim 1, wherein the defect recognition part recognizes a position of the defective part according to a difference between a coordinate position of a pixel clustered in the cluster having a difference in frequency and a coordinate position of a normal pattern in the layer structure of the cluster.

3. The defective part recognition device according to claim 1, wherein
the machine learning part sets a cluster for a defective part in addition to the cluster set according to the layer structure in the unit area, and
the defect recognition part recognizes a type of the defective part based on the pixel clustered in the cluster for the defective part.

4. A defective part recognition method comprising the steps of:
obtaining a magnified image of a unit area for recognizing a defective part on a surface of a multi-layer film substrate by irradiating the surface with white incident light;
acquiring, by using a spectral camera having an imaging surface on which the magnified image is formed, spectrum information on the magnified image for each pixel of the imaging surface;
clustering the spectrum information acquired for each pixel by the spectral camera into a cluster set according to a layer structure in the unit area;
generating a histogram with a frequency that is a number of pixels clustered into the cluster, and
comparing a frequency distribution of the generated histogram with a frequency distribution of a histogram free of defects and recognizing the defective part depending on presence of a cluster having a difference in frequency.

5. The defective part recognition method according to claim 4, further comprising the step of recognizing a position of the defective part according to a difference between a coordinate position of a pixel clustered in the cluster having a difference in frequency and a coordinate position of a normal pattern in the layer structure of the cluster.

6. The defective part recognition method according to claim 5, further comprising the step of re-clustering a pixel recognized as the defective part, wherein in addition to the cluster, a cluster for the defective part is set in the re-clustering, and a type of the defective part is recognized based on the pixel clustered in the cluster for the defective part.

7. The defective part recognition device according to claim 2, wherein
the machine learning part sets a cluster for a defective part in addition to the cluster set according to the layer structure in the unit area, and
the defect recognition part recognizes a type of the defective part based on the pixel clustered in the cluster for the defective part.

* * * * *